Figure 1:
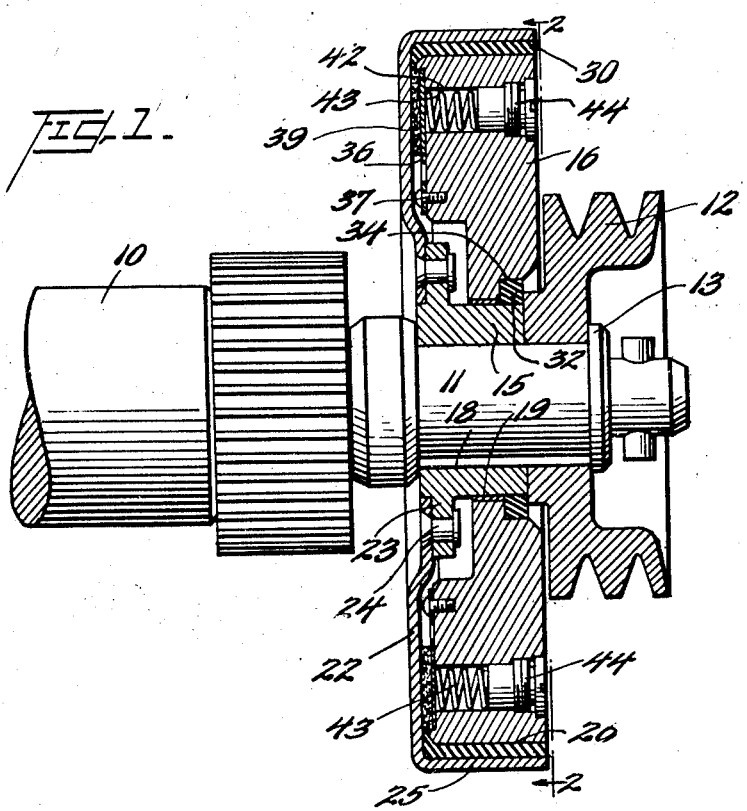

Dec. 18, 1934.  W. R. GRISWOLD  1,984,579

INTERNAL COMBUSTION ENGINE

Filed Jan. 31, 1933

Inventor
Walter R. Griswold

By Watson, Coit, Morse & Grindle
Attorney

Patented Dec. 18, 1934

1,984,579

UNITED STATES PATENT OFFICE 1,984,579

INTERNAL COMBUSTION ENGINE

Walter R. Griswold, Detroit, Mich., assignor to Packard Motor Car Company, Detroit, Mich., a corporation of Michigan Application January 31, 1933, Serial No. 654,496

6 Claims. (Cl. 74—574)

This invention relates to internal combustion engines and has for its object the provision of means for damping torsional vibrations induced in the engine crankshaft as the result of the periodic torque impulses applied thereto. It is a feature of the invention that the various component parts of the vibration damper may be separately and cheaply constructed and readily assembled.

The damper which forms the basis of the present invention is of the type employing an inertia member supported for slight displacement relative to the crankshaft in response to torsional vibrations induced in the shaft, and a coupling between the inertia member and the shaft, this coupling serving to yieldingly connect the inertia member to the shaft in such manner as to permit the required relative displacement of the inertia member and shaft, and also serving as an energy absorbing device, the energy of vibration being dissipated in the form of heat as the result of friction developed in the coupling on occurrence of such relative displacement.

More specifically, the present damper is of the type in which the inertia member is coupled to the shaft by means composed, at least in part, of rubber or similar material adapted to develop a considerable amount of internal friction when subjected to stress. The dissipation of energy by reason of such internal friction in a coupling member is frequently not sufficient to effectively damp the vibrations, and the action of the coupling member is preferably augmented by the provision of a friction connection between the inertia member and the shaft, the combined action of the yielding and friction connections serving to prevent dangerous increase in amplitude of the vibrations. It is a feature of the invention that the friction connection may be readily adjusted to alter the degree of friction after the damper has been installed, this being important in view of the difficulty of predetermining the amount of friction required in any given damper.

While rubber has heretofore been employed for the general purpose hereinbefore mentioned, it is sometimes difficult to apply a yielding coupling of this character to a damper in such a manner that the rubber will respond to vibrations of the extremely high frequency induced in crankshafts of modern internal combustion engines. While the amplitude of these vibrations is not large, they are capable of building up to dangerous proportions if not effectively damped, and it is important that the coupling should be so constructed that the rubber will be deformed to a considerable extent even though the amplitude of the induced vibrations and the resulting relative angular displacement of the crankshaft and inertia member are comparatively small.

In the present construction, the resilient coupling between the inertia member and the member carried by the crankshaft is disposed at a considerable radial distance from the shaft axis, at which point the relative linear movement of the inertia member and the member carried by the crankshaft is considerable, even for small relative angular displacement of the members. It has been found that with such disposition of the resilient coupling, the tendency of the inertia member to wobble during operation is much more effectively resisted by the rubber than when the latter is located at a point closer to the crankshaft axis, the leverage exerted on the rubber by the inertia member when displaced laterally of its normal plane of rotation being decreased as the radial distance between the shaft axis and the inertia member is increased. More specifically, it is an object of the invention to provide a torsional damper for crankshafts comprising an inertia member supported for rotation with respect to the shaft, a member rotatable with the shaft and having a portion encircling the inertia member, and a thin sheet of rubber or similar material interposed between the members and surface-bonded to both, whereby substantial deformation of the rubber may be effected on occurrence of vibrations of relatively small amplitude in the shaft.

It is a further object of the invention to provide, in a vibration damper of the type employing a hub member adapted to be secured to a shaft, an inertia member journaled by means of a bearing on the hub member, and a friction coupling between the inertia member and the hub member, means coacting with the members to house and completely isolate both the bearing for the inertia member and the friction coupling between the members, to prevent the entry of dirt and grease and the resulting impairment of efficiency of these parts. In accordance with the present invention, this isolation of the friction coupling and the bearing for the inertia member is effected by the provision of resilient elements bonded to both members and located on either side of the friction coupling and bearing, these resilient elements serving at the same time to connect the inertia member and hub member for substantially synchronous rotation, the elements being of such nature as to develop internal friction to augment the effect of the frictional connection in dissipating the energy of vibration.

Figure 2:
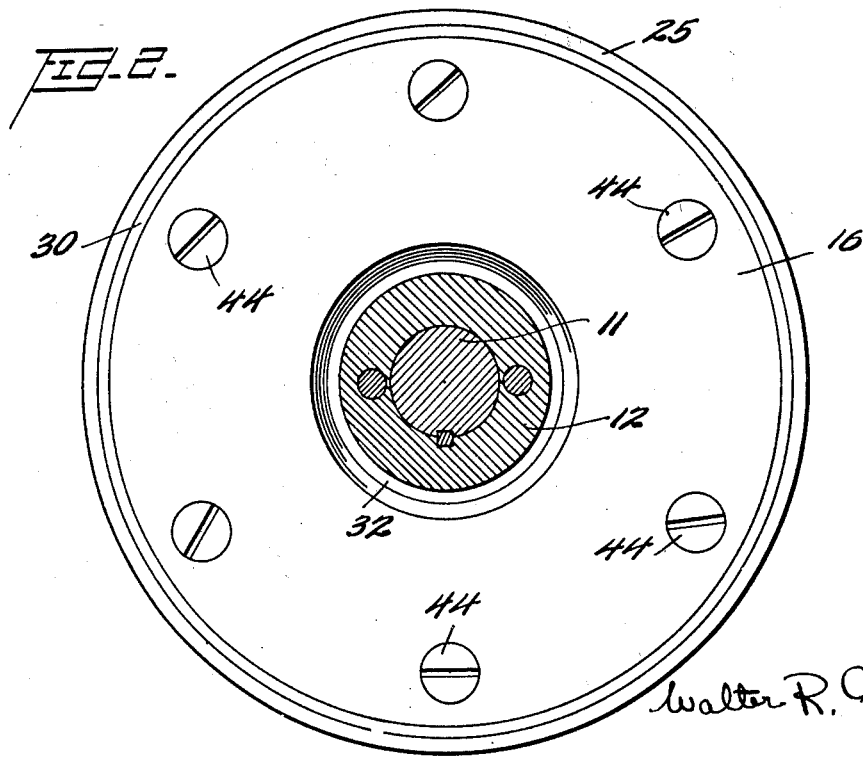

Further objects and features of the invention will be apparent from the following description taken in connection with the accompanying drawing, in which:

Figure 1 is a sectional view taken substantially on the diameter of a damper constructed in accordance with the invention; and Figure 2 is a view partly in section taken on the line 2—2 of Figure 1 and showing an elevation of the damper.

In describing the embodiment of the invention disclosed herein, specific language will be used in order to facilitate an understanding of the principles of the invention, but it will be understood that no limitation of the scope of the invention is thereby intended and that various changes and alterations may be made without departing from the spirit of the invention as claimed herein.

Referring specifically to the drawing, it will be observed that the damper is shown as supported on the forward end of a crankshaft 10, the crankshaft being reduced in size as indicated at 11 for this purpose. Preferably the damper is supported on this reduced portion of the crankshaft adjacent the usual fan pulley 12 which is retained in position on the shaft by the nut 13.

The damper consists primarily of a hub member 15 and an inertia member 16, the hub member 15 being fitted on the reduced portion 11 of the crankshaft and keyed or otherwise rigidly secured thereto as indicated at 18. The inertia member 16 is shown in the drawing as being of substantially annular shape and surrounds the hub member 15, being journaled thereon by the bearing 19, the bearing portion of the hub member being concentric with the crankshaft axis.

It will be observed by reference to Figure 1 of the drawing that the nut 13 serves to retain both the pulley 12 and the hub member 15 of the vibration damper on the forward end of the crankshaft against axial displacement with respect thereto, although it will be apparent from further description of the damper that the precise method of mounting the same on the crankshaft is not of primary importance.

Extending radially outward from the hub member 15 is a web member 22 which is shown in the drawing in the form of a relatively thin disc of metal, this disc being riveted or otherwise rigidly secured to an annular flange 23 on the hub member 15 as indicated at 24. At its outer extremity the web member 22 is extended axially to form a continuous and preferably substantially cylindrical rim member 25, this rim member being disposed in contiguous relation to the outer peripheral face 26 of the inertia member, which is of similar conformation. It will be observed that by this construction the opposing faces of the rim member 25 and the inertia member 16 are substantially parallel and in contiguous relation throughout, and that by reason of the location of these faces at the maximum distance from the axis of the crankshaft, any relative movement of the crankshaft and the inertia member will result in a very considerable linear displacement of the two faces with respect to each other.

It will be understood that the web member 22 and the rim member 25 are formed integrally and the hub member 15 is separately formed and rigidly secured to the web member for purpose of convenience, and that the precise construction is not of great importance. It is, however, of importance to insure that, as pointed out hereinbefore, the opposing faces of the rim member and the inertia member are in juxtaposed relation.

The damping or energy absorbing means of this invention includes a resilient deformable member 30, preferably of some imperfectly elastic material having considerable hysteresis or internal friction when subjected to cycles of deforming stress. The invention contemplates the use of rubber, rubberized fabric, or similar material for this purpose, but it is to be understood that any suitable material having sufficient hysteresis to absorb the necessary amount of vibratory energy to effectively damp the induced vibrations in the crankshaft may be employed. This member 30 is preferably in the form of a thin annular sheet surrounding the inertia member 16 and disposed between the peripheral face 26 of the inertia member and the encircling face of the rim member 25. It is preferably rigidly and permanently secured to these cooperating faces in any suitable manner, for instance by the use of a cement or other adhesive material, but in the event rubber is used it is preferable to directly vulcanize the member 30 to the opposing faces of the rim member 25 and the inertia member 16 by the application of heat and pressure in the well-known manner, thus forming a permanent assembly of the damper parts.

This surface-bonding of the member 30 to the opposed faces of the inertia member and the member carried by the shaft is of considerable importance since otherwise it is difficult to set up the necessary internal stress in the rubber on the occurrence of shaft vibrations, and since the surface friction which might occur in the absence of such bonding would rapidly destroy the member 30.

It will be appreciated from the foregoing description that the member 30 not only serves to resiliently couple the inertia member to the shaft so as to yieldingly resist slight relative displacement thereof on the occurrence of vibration but also, by reason of the internal friction developed when such relative displacement occurs, serves to absorb the energy of vibration inducing the relative displacement.

A member 32, consisting of an annulus of deformable material, preferably the same as that of which the member 30 is formed, is interposed between the hub member 15 and the inertia member 16 and is preferably surface-bonded to both as described in connection with the member 30. For convenience the member 32 may be seated in a recess 34 provided in the inner face of the inertia member. It will be observed that the member 32 will function in a manner similar to the member 30 but will have less effect by reason of the fact that it is located at a point closer to the crankshaft axis.

In order to assist the members 30 and 32 in dissipating the energy of vibration resulting from relative displacement or oscillatory movement of the inertia member 16 and the crankshaft, a friction connection is provided. In the form of the invention shown in the drawing this friction connection comprises an annular disc 36, for instance, a thin sheet metal plate, the plate 36 being secured to and against the rear face of the inertia member 16 by suitable means such as a plurality of circumferentially disposed rivets 37. Secured to the opposite face of the plate 36 is a friction developing means 39, preferably in the form of an annulus of any well-known friction developing material such as cork, asbestos, or the like. Ground cork impregnated with a binder has been found particularly suitable. It will be observed that the friction annulus bears against the web member 22 and that the latter is carried by the shaft, so that any relative displacement of the inertia member and shaft will result in the development of friction at the face of the friction annulus 39.

In order to increase the amount of friction developed by the annulus 39, the inertia member is preferably provided at a plurality of circumferentially spaced points with apertures 42 extending through the inertia member from the rear to the forward side thereof. A coiled spring or other resilient means 43 is located in this aperture and engages the plate 39, the spring reacting against a screw 44 which is threaded in the outer end of the aperture 42, so that by manipulation of the screw the degree of compression of the spring 43 and thereby the amount of friction developed at the face of the annulus 39 may be readily adjusted from outside the damper and without interference with the working parts.

It will now be appreciated that by reason of the location of the resilient elements 30 and 32 between the inertia member and the shaft carrying member on opposite sides of the bearing 19 and the friction developing means 39, the latter are completely enclosed, this being an important feature inasmuch as vibration dampers for crankshafts are usually employed where they are exposed to grease, oil, and water, the entry of which into the working parts of the damper would seriously affect the operation and shorten the life thereof.

Having thus described the invention, what is claimed as new and desired to be secured by Letters Patent is:

1. In a vibration damper for crankshafts, the combination with a member adapted to be secured to a shaft and having a cylindrical hub portion, an axially extending cylindrical outer rim portion overlying said hub portion, and a web connecting said portions, of an inertia member of annular shape positioned intermediate said rim and hub portions and journaled on the latter, means of deformable, energy absorbing material interposed between and surface-bonded to said rim portion and said inertia member over substantially the entire peripheral surface of the latter to resist relative rotation of said members, and a friction connection between said inertia member and said web, whereby vibrations of relatively low amplitude and high frequency may be effectively dampened.

2. In a vibration damper for crankshafts, the combination with a hub member adapted for mounting on a shaft, of an inertia member having a bearing portion rotatable on said hub member, a friction connection between said members, and means cooperating with said members to completely house said friction connection and bearing portion, said means comprising deformable material positioned between said members on one side of said friction connection and bearing portion and surface-bonded to both members, said last named means serving to resist the reaction of said friction connection.

3. In a vibration damper for shafts, the combination with a hub member having an external bearing and adapted to be secured on a shaft, said hub member having a hub portion, an outwardly extending web portion, and an axially extending rim portion overlying said hub portion, said web portion, hub portion, and rim portion forming a substantially cup-shaped housing, of an annular inertia member journaled on said bearing and lying within said housing, a friction connection between said members and annular deformable elements interposed between said inertia member and said hub portion on that side of the said bearing remote from the web, and between said rim portion and said inertia member, said elements being surface-bonded to both members and serving to resist the reaction of said friction connection.

4. In a vibration damper for shafts, the combination with a hub member having an external bearing and adapted to be secured on a shaft, said hub member having a hub portion, an outwardly extending web portion, and an axially extending rim portion overlying said hub portion, said web portion, hub portion, and rim portion forming a substantially cup-shaped housing, of an annular inertia member journaled on said bearing and lying within said housing, annular deformable elements interposed between and surface-bonded to said inertia member and said hub portion on that side of the said bearing remote from the web, and interposed between and surface-bonded to said rim portion and said inertia member over substantially the entire peripheral surface of the latter, and a friction connection between said inertia member and said web portion, whereby vibrations of relatively low amplitude and high frequency may be effectively damped.

5. In a vibration damper for crankshafts, the combination with a member adapted to be secured to a shaft and having a cylindrical hub portion, an axially extending cylindrical outer rim portion overlying said hub portion, and a web connecting said portions, of an inertia member of annular shape positioned intermediate said rim and hub portions and journaled on the latter, a friction device acting between said inertia member and said web, said inertia member being provided with an aperture extending therethrough, means extending within said aperture for controlling the friction developed by said friction device, and means carried by said inertia member for varying the degree of effectiveness of said controlling means.

6. In a vibration damper for crankshafts, the combination with a member adapted to be secured to a shaft and having a cylindrical hub portion, an axially extending cylindrical outer rim portion overlying said hub portion, and a web connecting said portions, of an inertia member of annular shape positioned intermediate said rim and hub portions and journaled on the latter, a friction device acting between said inertia member and said web, means carried by the inertia member for controlling the friction developed by said friction device, and means carried by said inertia member for varying the degree of effectiveness of said controlling means.

WALTER R. GRISWOLD.